US012699604B2

(12) United States Patent
Osadchyy et al.

(10) Patent No.: US 12,699,604 B2
(45) Date of Patent: Aug. 4, 2026

(54) CONTAINER LAYER TRANSLATION ACROSS PROCESSOR ARCHITECTURES AND RESOURCE HETEROGENEITY

(71) Applicant: International Business Machines Corporation, Armonk, NY (US)

(72) Inventors: Oleksandr Osadchyy, Concord, CA (US); Christopher Thomas Vogan, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/301,673

(22) Filed: Apr. 17, 2023

(65) Prior Publication Data

US 2024/0345902 A1     Oct. 17, 2024

(51) Int. Cl.
*G06F 9/54* (2006.01)

(52) U.S. Cl.
CPC .................................... G06F 9/541 (2013.01)

(58) Field of Classification Search
CPC ...................................................... G06F 9/541
See application file for complete search history.

(56) References Cited

U.S. PATENT DOCUMENTS

| | | | |
|---|---|---|---|
| 6,209,124 B1 | 3/2001 | Vermeire et al. | |
| 8,850,423 B2 | 9/2014 | Barkie et al. | |
| 2018/0203744 A1 | 7/2018 | Wiesmaier et al. | |

FOREIGN PATENT DOCUMENTS

| | | |
|---|---|---|
| CN | 110427226 A | 11/2019 |
| CN | 111198744 A | 5/2020 |
| CN | 111309401 A | 6/2020 |
| CN | 111309451 A | 6/2020 |
| CN | 112162852 A | 1/2021 |
| CN | 112306492 A | 2/2021 |
| CN | 112363728 A | 2/2021 |
| CN | 112667352 A | 4/2021 |
| CN | 112965819 A | 6/2021 |
| CN | 113064595 A | 7/2021 |
| CN | 114443221 A | 5/2022 |
| CN | 114741086 A | 7/2022 |
| CN | 110989983 B | 11/2022 |
| CN | 112130871 B | 11/2022 |

*Primary Examiner* — Gregory A Kessler
(74) *Attorney, Agent, or Firm* — Yee & Associates, P.C.

(57) ABSTRACT

Performing container layer translation across different types of processor architectures is provided. Dynamic mapping of respective source image layers of an original source container image built for a first type of processor architecture to corresponding target image layers for a second type of processor architecture that is different from the first type of processor architecture is performed. Computational resource ratios needed to run dynamically mapped image layers of a target container image using the second type of processor architecture is determined based, at least in part, on a technical stack type of an application associated with the respective source image layers of the original source container image. The target container image having the dynamically mapped image layers along with the computational resource ratios is served to a target host computer node that includes the second type of processor architecture via a network.

20 Claims, 7 Drawing Sheets

COMPUTING ENVIRONMENT
100

FIG. 1

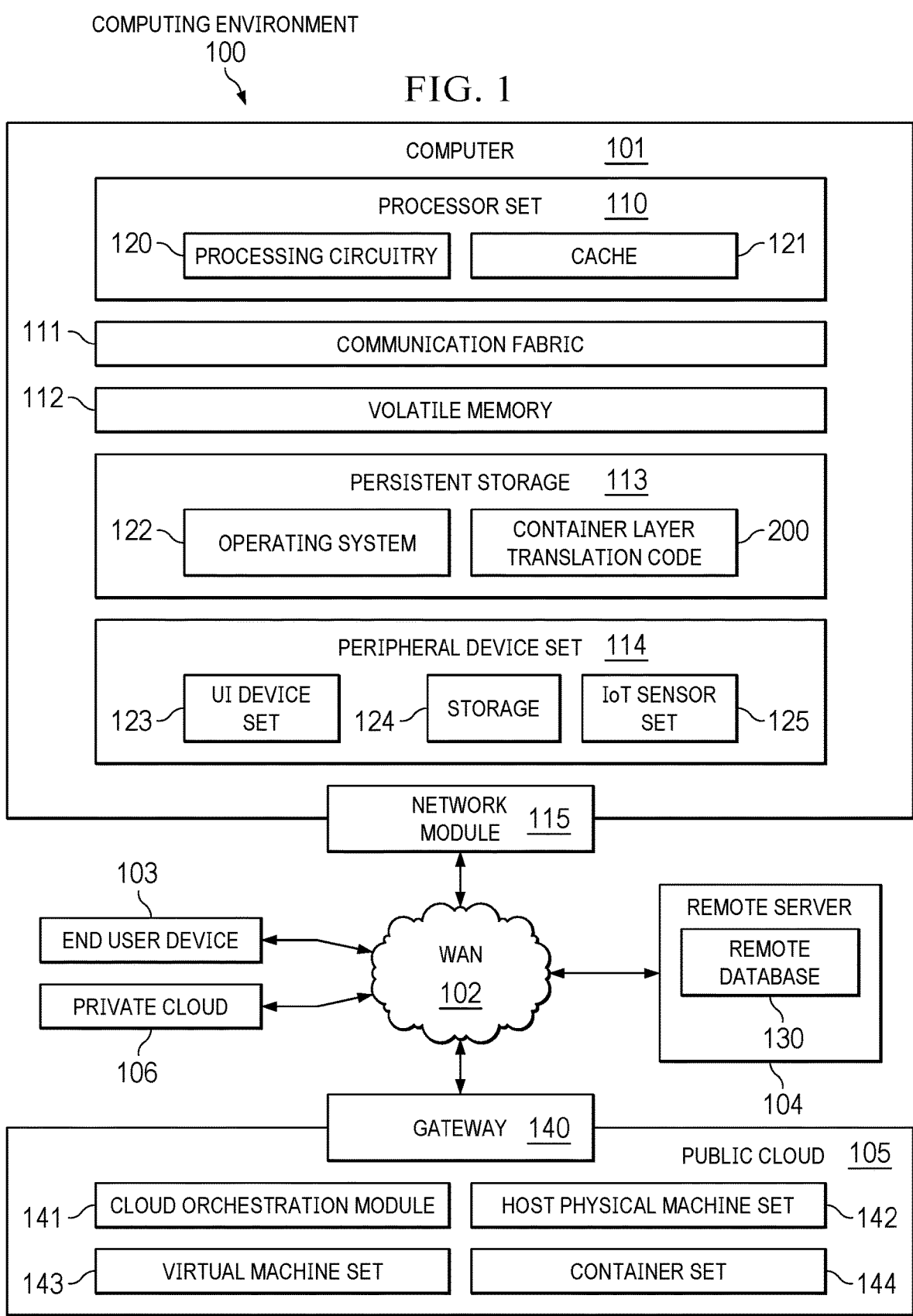

COMPUTER   101

PROCESSOR SET   110

120 — PROCESSING CIRCUITRY     CACHE — 121

111 — COMMUNICATION FABRIC

112 — VOLATILE MEMORY

PERSISTENT STORAGE   113

122 — OPERATING SYSTEM     CONTAINER LAYER TRANSLATION CODE — 200

PERIPHERAL DEVICE SET   114

123 — UI DEVICE SET     124 — STORAGE     IoT SENSOR SET — 125

NETWORK MODULE   115

103

END USER DEVICE

PRIVATE CLOUD

106

WAN 102

REMOTE SERVER

REMOTE DATABASE

130

104

GATEWAY   140

PUBLIC CLOUD   105

141 — CLOUD ORCHESTRATION MODULE     HOST PHYSICAL MACHINE SET — 142

143 — VIRTUAL MACHINE SET     CONTAINER SET — 144

MAPPING TABLE 600

| IMAGE LAYER | APPLICATION TYPE | PROCESSOR ARCHITECTURE AFFINITY | MAPPING OPERATION | RESOURCE RATIOS (e.g., x86 -> s390x) |
|---|---|---|---|---|
| APP INITIAL DATA, APP CONFIG DATA | - | x86, s390x, ppc64le, armv7l | TRANSFER | CPU: 1:1 RAM: 1:1 |
| BINARY APPLICATION | NON-CORE FUNCTIONS | x86, s390x, ppc64le, armv7l | SUBSTITUTE, CONVERT | CPU: 6:1, 1:1 RAM: 2:1, 1:1 |
| BINARY APPLICATION | CORE FUNCTIONS | ORIGINAL | SUBSTITUTE, CONVERT | CPU: 6:1, 1:1 RAM: 2:1, 1:1 |
| BINARY APPLICATION | DATABASE | s390x | SUBSTITUTE, CONVERT | CPU: 8:1, 2:1 RAM: 2:1, 1:1 |
| INTERPRETIVE APPLICATION | - | x86, s390x, ppc64le, armv7l | TRANSFER | CPU: 4:1 RAM: 2:1 |
| BASE OS | - | x86, s390x, ppc64le, armv7l | SUBSTITUTE | CPU: 2:1 RAM: 1:1 |

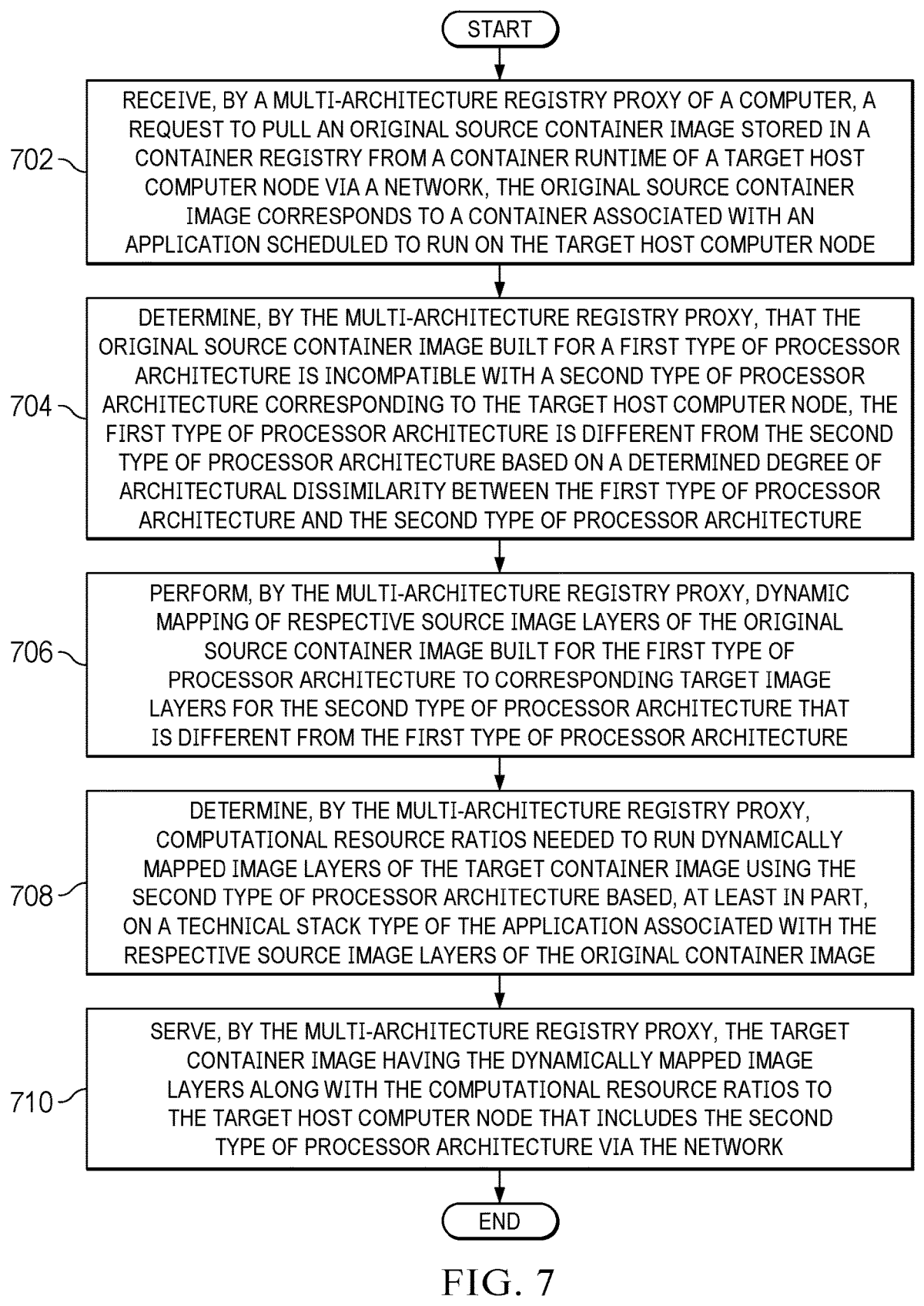

START

702 — RECEIVE, BY A MULTI-ARCHITECTURE REGISTRY PROXY OF A COMPUTER, A REQUEST TO PULL AN ORIGINAL SOURCE CONTAINER IMAGE STORED IN A CONTAINER REGISTRY FROM A CONTAINER RUNTIME OF A TARGET HOST COMPUTER NODE VIA A NETWORK, THE ORIGINAL SOURCE CONTAINER IMAGE CORRESPONDS TO A CONTAINER ASSOCIATED WITH AN APPLICATION SCHEDULED TO RUN ON THE TARGET HOST COMPUTER NODE

704 — DETERMINE, BY THE MULTI-ARCHITECTURE REGISTRY PROXY, THAT THE ORIGINAL SOURCE CONTAINER IMAGE BUILT FOR A FIRST TYPE OF PROCESSOR ARCHITECTURE IS INCOMPATIBLE WITH A SECOND TYPE OF PROCESSOR ARCHITECTURE CORRESPONDING TO THE TARGET HOST COMPUTER NODE, THE FIRST TYPE OF PROCESSOR ARCHITECTURE IS DIFFERENT FROM THE SECOND TYPE OF PROCESSOR ARCHITECTURE BASED ON A DETERMINED DEGREE OF ARCHITECTURAL DISSIMILARITY BETWEEN THE FIRST TYPE OF PROCESSOR ARCHITECTURE AND THE SECOND TYPE OF PROCESSOR ARCHITECTURE

706 — PERFORM, BY THE MULTI-ARCHITECTURE REGISTRY PROXY, DYNAMIC MAPPING OF RESPECTIVE SOURCE IMAGE LAYERS OF THE ORIGINAL SOURCE CONTAINER IMAGE BUILT FOR THE FIRST TYPE OF PROCESSOR ARCHITECTURE TO CORRESPONDING TARGET IMAGE LAYERS FOR THE SECOND TYPE OF PROCESSOR ARCHITECTURE THAT IS DIFFERENT FROM THE FIRST TYPE OF PROCESSOR ARCHITECTURE

708 — DETERMINE, BY THE MULTI-ARCHITECTURE REGISTRY PROXY, COMPUTATIONAL RESOURCE RATIOS NEEDED TO RUN DYNAMICALLY MAPPED IMAGE LAYERS OF THE TARGET CONTAINER IMAGE USING THE SECOND TYPE OF PROCESSOR ARCHITECTURE BASED, AT LEAST IN PART, ON A TECHNICAL STACK TYPE OF THE APPLICATION ASSOCIATED WITH THE RESPECTIVE SOURCE IMAGE LAYERS OF THE ORIGINAL CONTAINER IMAGE

710 — SERVE, BY THE MULTI-ARCHITECTURE REGISTRY PROXY, THE TARGET CONTAINER IMAGE HAVING THE DYNAMICALLY MAPPED IMAGE LAYERS ALONG WITH THE COMPUTATIONAL RESOURCE RATIOS TO THE TARGET HOST COMPUTER NODE THAT INCLUDES THE SECOND TYPE OF PROCESSOR ARCHITECTURE VIA THE NETWORK

END

FIG. 7

CONTAINER LAYER TRANSLATION ACROSS PROCESSOR ARCHITECTURES AND RESOURCE HETEROGENEITY

BACKGROUND

The disclosure relates generally to container orchestration environments and more specifically to performing container layer translation across different types of processor architectures and computational resource heterogeneity within container orchestration environments.

A container orchestration environment, such as, for example, Kubernetes® (a registered trademark of the Linux Foundation of San Francisco, California), provides a platform for automating deployment, scaling, and operations of containers across clusters of host computer nodes. A host computer node is a machine, either physical or virtual, where containers (i.e., application workloads) are deployed. A pod is a group of one or more containers, with shared storage and network resources, and a specification for how to run the containers. A pod's contents are always co-located and co-scheduled and run in a shared context. A host computer node hosts the pods that are the components of the application workload.

A container scheduler selects which host computer node a container is to run on based on, for example, resource availability of respective host computer nodes. The container scheduler tracks resource utilization on each respective host computer node to ensure that workload is not scheduled in excess of available resources.

A container manager manages the creation, deployment, scaling, availability, and destruction of containers. In other words, the container manager performs complete container lifecycle management on a single host node. A container runtime isolates resources for a container and runs the container. A container runtime is needed on every host node in a cluster. Typically, a developer creates a container image and publishes the container image to a container repository. Then, the container manager pulls down the container image from the container repository onto a target host node and the container runtime runs the container. However, for the sake of simplicity, as used herein, a container runtime refers to both the container manager and the container runtime.

SUMMARY

According to one illustrative embodiment, a computer-implemented method for performing container layer translation across different types of processor architectures is provided. A multi-architecture registry proxy performs dynamic mapping of respective source image layers of an original source container image built for a first type of processor architecture to corresponding target image layers for a second type of processor architecture that is different from the first type of processor architecture. The multi-architecture registry proxy determines computational resource ratios needed to run dynamically mapped image layers of a target container image using the second type of processor architecture based, at least in part, on a technical stack type of an application associated with the respective source image layers of the original source container image. The multi-architecture registry proxy serves the target container image having the dynamically mapped image layers along with the computational resource ratios to a target host computer node that includes the second type of processor architecture via a network. According to other illustrative embodiments, a computer system and computer program product for performing container layer translation across different types of processor architectures are provided.

BRIEF DESCRIPTION OF THE DRAWINGS

FIG. 1 is a pictorial representation of a computing environment in which illustrative embodiments may be implemented;

FIG. 6 is a diagram illustrating an example of a mapping table in accordance with an illustrative embodiment; and FIG. 7 is a flowchart illustrating a process for performing container layer translation across different types of processor architectures and computational resource heterogeneity in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, mechanically encoded device (such as pits/lands formed in a major surface of a disc), solid-state disk (SSD), universal serial bus (USB) flash drive, or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
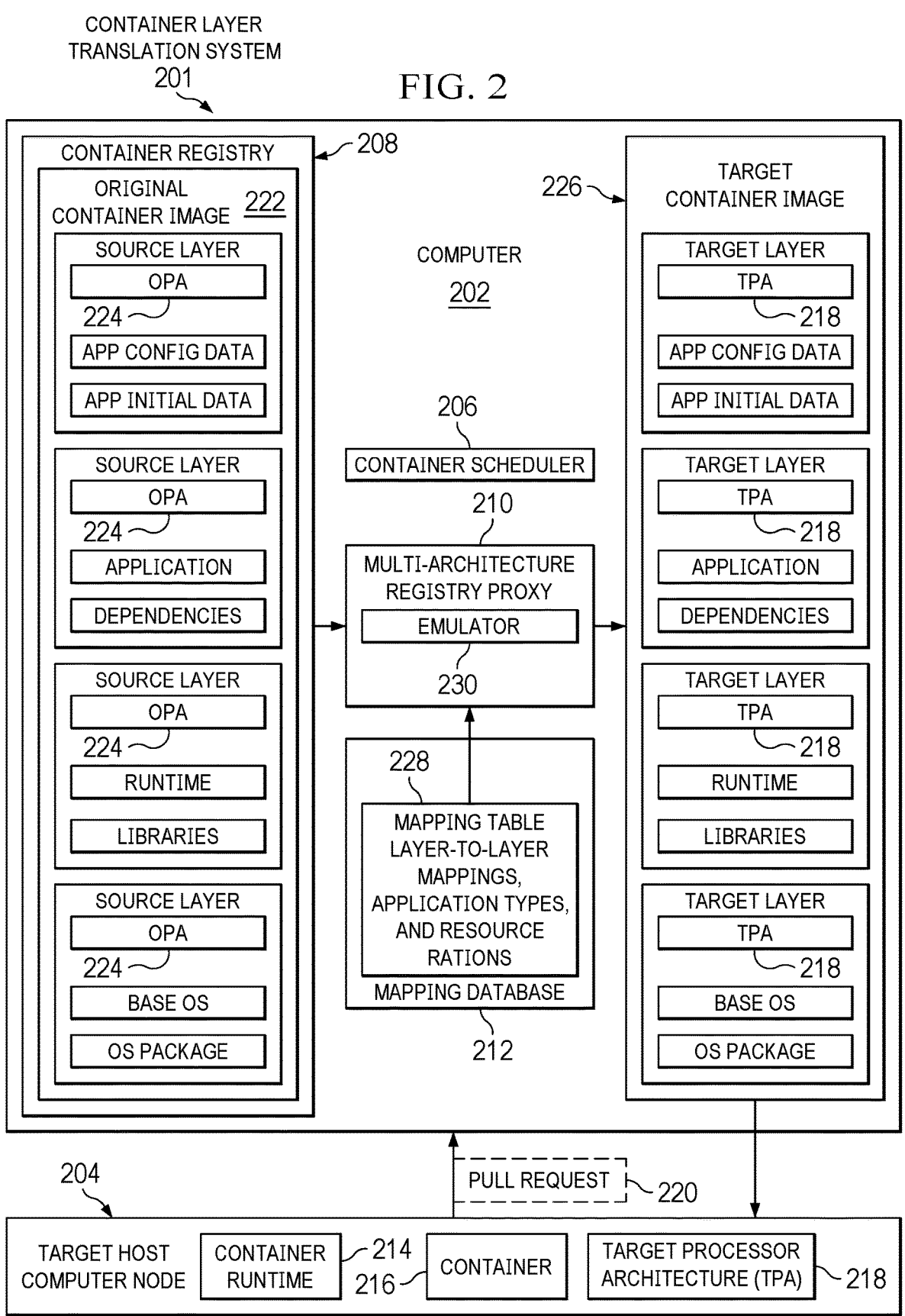
FIG. 2 is a diagram illustrating an example of a container layer translation system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as container layer translation code 200. Container layer translation code 200 performs container layer translation across different processor architectures and resource heterogeneity within container orchestration environments. For example, container layer translation code 200 works directly on an original source container image replacing layers of that image, only when needed, with layers (e.g., base operating system, operating system packages, libraries, runtimes, and the like) corresponding to a target processor architecture that the container corresponding to that image is to run on. For example, natively run containers built for a particular processor architecture cannot run on another processor architecture without access to the original build source code. Container layer translation code 200 takes into account respective container layers and application type while mapping container computational resource requirements from source processor architecture to target processor architecture. In addition, container layer translation code 200 differentiates compatibility levels of dependencies and the differences in computational resource requirements between the source and target processor architectures.

In addition to container layer translation code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and container layer translation code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, server, data center computer, mainframe computer, quantum computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in container layer translation code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The container layer translation code included in block 200 includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (for example, a system administrator of an entity that operates computer 101), and may take any of the forms discussed above in connection with computer 101. EUD 103 typically receives helpful and useful data from the operations of computer 101. For example, in a hypothetical case where computer 101 is designed to provide a container layer mapping recommendation to the end user, this recommendation would typically be communicated from network module 115 of computer 101 through WAN 102 to EUD 103. In this way, EUD 103 can display, or otherwise present, the container layer mapping recommendation to the end user. In some embodiments, EUD 103 may be a client device, such as thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a container layer mapping recommendation based on historical container layer mapping data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Container technology is meant to eliminate the need for rebuilding containers when deploying or moving an application to a new execution environment. A container corresponding to an application consists of the entire application runtime, along with its dependencies, libraries, and binaries bundled into a package that is portable across any type of host execution environment. The package is saved as a plurality of layers and is referred to as a container image. The container image format of the layers and metadata is unified by the Open Container Initiative® (a registered trademark of the Linux Foundation, San Francisco, CA, USA). An instance of a container image is called a container or a running container. There can be many running containers corresponding to the same container image. Containers can be running on different container runtimes, operating systems, and virtual or physical host computers.

An issue with trying to run a container on a host computer with a different processor architecture than the current container architecture means rebuilding the container image. When a compiler compiles an application, the compiler renders a binary to execute on a specific processor architecture, such as, for example, an x86 processor architecture. That same binary will not run on another processor architecture, such as, for example, an s390x processor architecture. The container is a more complex binary image or a set of binaries and non-binaries representing the application with all its dependencies, which includes third-party libraries, runtimes, operating system with its libraries and packages, and the like. Even when the container image is rebuilt, it is difficult to predict how the application will execute on the other type of processor architecture with regard to computational resource requirements. A container image cannot be built abstractly from the processor architecture that the container image was built to run on. In other words, a user, such as, for example, a program developer, system administrator, or the like, has to build a single processor architecture container image for each host computer having a different processor architecture (i.e., a "multi-architecture container"). This involves overhead and currency gaps, which hinders the adoption of container technology across different processor architecture platforms.

For example, a popular opensource HTTP web server, Apache Tomcat® (a registered trademark of the Apache Software Foundation, Wilmington, DE, USA), is written in Java® (a registered trademark of Oracle America, Inc., Redwood Shores, CA, USA). As with any other Java application, the application is compiled once and then executed on various processor architectures including, for example, x86, s390x, arm64, and the like. However, a container image built with Tomcat can only run on a specific processor architecture for which the container image was built. The manifest list for the container image identifies the image layers for the processor architecture and operating system combination the container image was built to run on. Thus, for a seemingly portable Java application, its container image is restrictive as to the type of processor architecture it can run on. Also, to perform at the same level, that same Java application may require fewer processor cores on s390x than on x86 or arm64. It may also require less RAM to execute due to a more efficient caching or a more performant I/O subsystem for network and storage on the target platform such as s390x. However, no solution currently exists to provide such mappings of the different processor resource requirements of containers for more predictable executions.

Illustrative embodiments include a container registry, an original container image for a particular processor architecture, a container runtime, a multi-architecture registry proxy, a target container image for a different processor architecture, and a target execution platform (i.e., host computer node). Illustrative embodiments enable the original container image, which is built for a specific processor architecture, to run on the target execution platform that has a different processor architecture or multiple different processor architectures. The multi-architecture registry proxy of illustrative embodiments is located between the container registry and the container runtime to enable dynamic mapping of layers in the original source container image, which is built for the specific processor architecture, to layers in the target container image corresponding to the different processor architecture of the target host computer node. The functions of the multi-architecture registry proxy include, for example, mapping original container layers to corresponding target container layers, determining ratios of different computational resource needs based on application technical stack type, generating new hashes for all the source container layers for security purposes so that the container runtime will accept the translated target container layers, and the like.

The multi-architecture registry proxy feeds the computational resource ratios to the container scheduler for determining which host computer node has available and sufficient resources to run the container. In addition, the container runtime can monitor and update usage of the resources on the target host computer node. For example, a container needs 2 CPU cores to run on x86 and 1 CPU core to run on s390x. There is an x86 host computer node and an s390x host computer node, each with 1 CPU core available. Without utilizing the computational resource mapping of illustrative embodiments, the container scheduler will not be able to schedule the container on either of these host computer nodes. By utilizing the computational resource ratio mapping of illustrative embodiments, the container scheduler can now determine that the s390x host computer node has enough CPU cores to run the container. After the container scheduler schedules the container, the container runtime pulls the container image down and starts it. Then, the container runtime decreases the available CPU cores on the s390x host computer node by 1 using the computational resource ratio again.

Illustrative embodiments differ from current solutions by taking a more holistic approach to the issue of heterogeneity of execution environments corresponding to different processor architectures and providing a novel solution that is relevant to current container technology. For example, current solutions migrate source applications to heterogeneous host computers by taking into account software and hardware dependencies. However, these current solutions do not differentiate between the different types of applications by technical stack and do not distinguish layers that can be recognized within every container image corresponding to an application. In addition, these current solutions lack inclusion of the application runtime, along with dependencies and operating system, into a single package found in current container technology. This limits the types of applications that can benefit from these current solutions, as well as requiring further refinements and creating difficulties in generating arbitrary automations.

Other known solutions execute containerized applications by emulating the processor architecture for the entire container image, without differentiating container layers or the type of the application. Thus, these other known solutions that do not differentiate container layers and application type, create inefficiencies due to the overhead of performing emulation for all container layers and application components and dependencies. Furthermore, such low-level indifferent solutions described above do not predict how much more or less computational resources a container will need to run on this or that type of target processor architecture. As a result, these low-level indifferent solutions described above prevent usage of quality-of-service methods and reduce accuracy of computational resource planning.

In a typical container orchestration environment (e.g., Kubernetes or the like), containers that package executable software could run on one or more host computer nodes. A container as used herein is an executable package of software that includes all needed dependencies and is executed by the container runtime. Examples of containers include, for example, databases, application runtimes with business uses, messaging and streaming platforms, agents and tools for security, logging, and monitoring, identity management services, API gateways, operating systems, and proprietary and binary application containers. The container scheduler determines the suitable host computer node for a container to run on and instructs the container runtime to pull the corresponding container image from the container registry. Scheduling criteria may be, for example, available resources, affinity to other containers, affinity to processor architecture, affinity to host node characteristics, a previously stopped container, and the like. The container runtime pulls the container image from the container registry and instantiates the container for execution.

Each host computer node has at least one instance of the container runtime to be able to execute containers and to be considered a part of the container orchestration environment. Host computer nodes can have various hardware architectures that include, for example, processor architectures such as x86, s390x, ppc64le, arm64, and armv7l; cache structures such as level 1, level 2, level 3, and level 4; I/O channels for small or large volumes of simultaneous I/O operations; large and small amounts of RAM, and the like.

Thus, illustrative embodiments provide one or more technical solutions that overcome a technical problem while trying to run a container, which was built to run on a particular type of processor architecture, on a host computer node that has a different type of processor architecture that is incompatible with the container. As a result, these one or more technical solutions provide a technical effect and practical application in the field of container orchestration environments.

With reference now to FIG. 2, a diagram illustrating an example of a container layer translation system is depicted in accordance with an illustrative embodiment. Container layer translation system 201 may be implemented in a computing environment, such as computing environment 100 in FIG. 1. Container layer translation system 201 is a system of hardware and software components for translating container image layers across different processor architectures with resource heterogeneity.

In this example, container layer translation system 201 includes computer 202 and target host computer node 204. Computer 202 may be, for example, computer 101 in FIG. 1. Target host computer node 204 may be, for example, one of host physical machine set 142 in FIG. 1. However, it should be noted that container layer translation system 201 is intended as an example only and not as a limitation on illustrative embodiments. For example, container layer translation system 201 can include any number of computers, target host computer nodes, and other devices and components not shown.

In this example, computer 202 includes container scheduler 206, container registry 208, multi-architecture registry proxy 210, and mapping database 212. However, in an alternative illustrative embodiment, multi-architecture registry proxy 210 can be built in container registry 208. Container scheduler 206 schedules containers to run on different target host computer nodes. Container registry 208 stores a plurality of original container images. However, it should be noted that even though container registry 208 is shown as a component of computer 202, in an alternative illustrative embodiment container registry 208 can be located in a remote server, such as remote server 104 in FIG. 1. In addition, container registry 208 can represent a plurality of different container registries. Multi-architecture registry proxy 210 performs the layer mappings between original source container images and target container images corresponding to different processor architectures. Multi-architecture registry proxy 210 may be implemented by, for example, container layer translation code 200 in FIG. 1. Mapping database 212 provides the information needed by multi-architecture registry proxy 210 to perform the image layer mappings.

In this example, container runtime 214 receives a notification from container scheduler 206 that container 216 is scheduled to run on target host computer node 204. Target host computer node 204 includes target processor architecture (TPA) 218. In response to receiving the notification from container scheduler 206, container runtime 214 sends pull request 220 for original container image 222, which corresponds to container 216, to multi-architecture registry proxy 210. Multi-architecture registry proxy 210 then pulls original container image 222 from container registry 208. However, it should be noted that original container image 222 is built for original processor architecture (OPA) 224 (e.g., x86 processor architecture), which is different from target processor architecture 218 (e.g., s390x processor architecture).

Illustrative embodiments enable original container images, which are built for specific processor architectures, to run on any target execution environment (e.g., target host computer node 204) that has a different processor architecture or multiple different processor architectures. Illustrative embodiments achieve this by placing multi-architecture registry proxy 210 between container registries and the container runtimes of host computer nodes to enable the dynamic mapping of layers in original container images to corresponding layers in target container images, such as target container image 226.

Multi-architecture registry proxy 210 performs a plurality of functions, such as, for example, mapping source container layers to target container layers, determining ratios of computational resources based on application technical stack type, generating new hashes for all the source container layers so that container runtime 214 accepts the translated target container layers, and the like. Multi-architecture registry proxy 210 maps each respective source layer of original container image 222 built for original processor architecture 224 to a corresponding target layer for target processor architecture 218 and utilizes the target layers to generate target container image 226 based on the mapping. In an alternative illustrative embodiment, container runtime 214 can modify pull request 220 for original container image 222 to include information, such as, for example, a modified manifest list identifying target layers of target container image 226 for target processor architecture 218.

The Open Containers Initiative defines a container image as a manifest with a configuration and plurality of layers for a specific processor architecture and operating system combination. As used herein, an original container image defines a container image that a program developer builds and publishes for a particular processor architecture. Multi-architecture registry proxy 210 of illustrative embodiments examines each respective layer of original container image 222. Multi-architecture registry proxy 210 initially considers each respective layer as a layer built for original processor architecture 224. Then, multi-architecture registry proxy 210 retrieves information, such as layer-to-layer mappings, application type, computational resource ratios, and the like, from mapping table 228 and generates respective target layers of target container image 226 for target processor architecture 218. Container image layers include, for example, application configuration data, application initial data, application, its associated dependencies, runtime, libraries, base operating system, and optional operating system packages. Multi-architecture registry proxy 210 performs mapping operations that include transfer, substitute, and convert. Multi-architecture registry proxy 210 utilizes emulator 230 to perform the conversion mapping operation by, for example, wrapping a binary of the application with an emulation (i.e., instructions) for target processor architecture 218. Emulator 230 can represent a plurality of different emulators for a plurality of different processor architectures. In addition, multi-architecture registry proxy 210 determines the type of the application, processor architecture affinity, and computational resource ratios by analyzing the information contained in mapping table 228.

Figure 3:
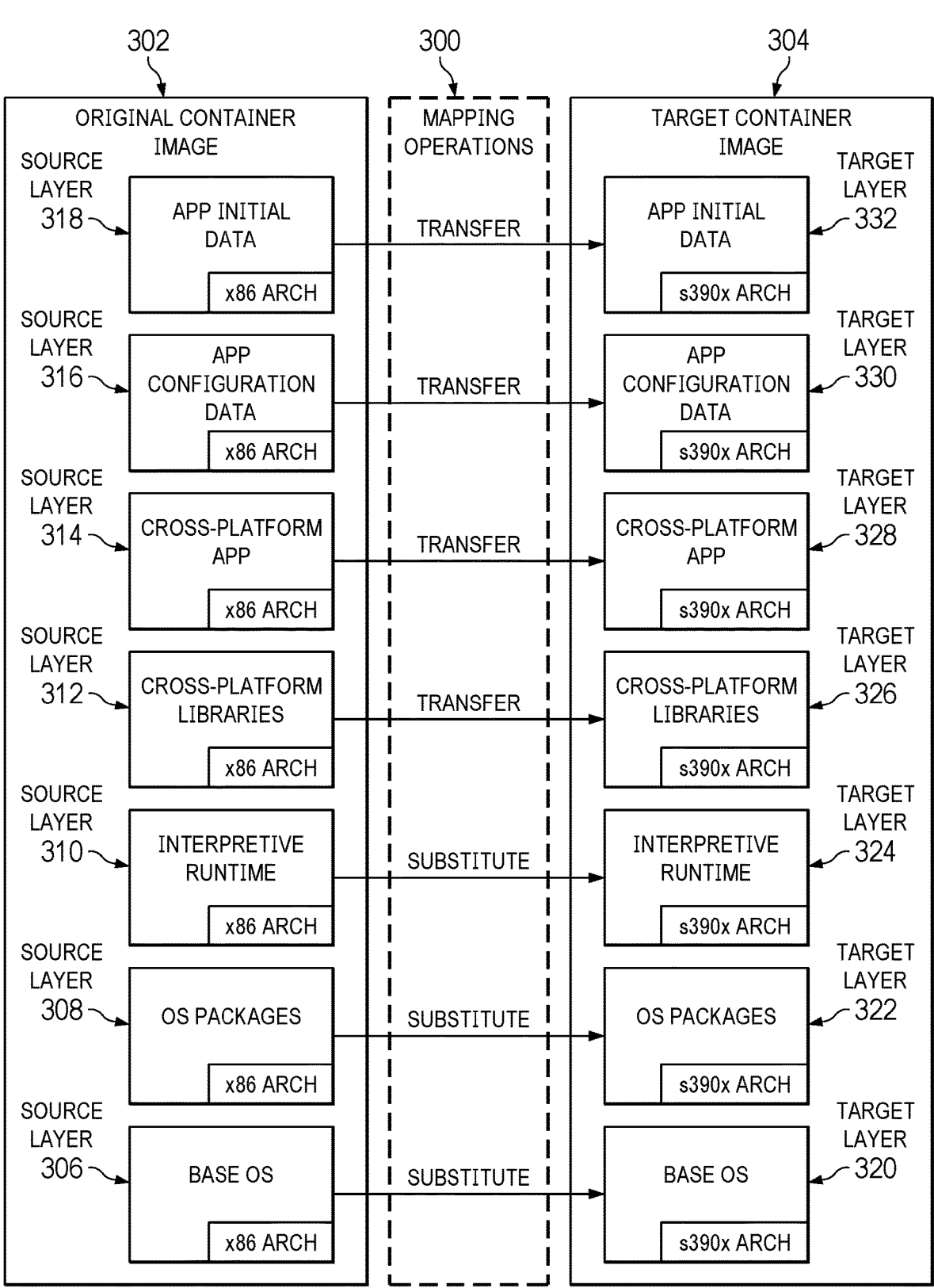
FIG. 3 is a diagram illustrating an example of container layer mapping operations in accordance with an illustrative embodiment.

With reference now to FIG. 3, a diagram illustrating an example of container layer mapping operations is depicted in accordance with an illustrative embodiment. Mapping operations 300 are implemented in a multi-architecture registry proxy, such as, for example, multi-architecture registry proxy 210 in FIG. 2.

In this example, mapping operations 300 involve original container image 302 and target container image 304, such as, for example, original container image 222 and target container image 226 in FIG. 2. Original container image 302 includes source layer 306, source layer 308, source layer 310, source layer 312, source layer 314, source layer 316, and source layer 318. Similarly, target container image 304 includes target layer 320, target layer 322, target layer 324, target layer 326, target layer 328, target layer 330, and target layer 332. It should be noted that target layer 320, target layer 322, target layer 324, target layer 326, target layer 328, target layer 330, and target layer 332 correspond to source layer 306, source layer 308, source layer 310, source layer 312, source layer 314, source layer 316, and source layer 318, respectively. However, it should also be noted that source layer 306, source layer 308, source layer 310, source layer 312, source layer 314, source layer 316, and source layer 318 are each built for a specific processor architecture (e.g., x86 processor architecture) and target layer 320, target layer 322, target layer 324, target layer 326, target layer 328, target layer 330, and target layer 332 are each built and optimized for a different specific processor architecture (e.g., s390x processor architecture).

Furthermore, in this example, original container image 302 corresponds to a cross-platform interpretive application, such as, for example, a Java application. For original container images corresponding to cross-platform interpretive applications, the multi-architecture registry proxy performs mapping operations of either transfer or substitute. For example, source layer 318 of application initial data and source layer 316 of application configuration data are platform and processor architecture neutral. As a result, the multi-architecture registry proxy transfers the files in source layer 318 and source layer 316 as they are to target container image 304. Examples of such files include, for example, YAML files, configuration files, and the like. In addition, the multi-architecture registry proxy transfers source layer 314 of cross-platform interpretive application and its associated source layer 312 of cross-platform interpretive libraries as they are because of their abstraction from the underlying platform and processor architecture.

However, the interpretive runtime for such a cross-platform interpretive application is platform native (i.e., built for a particular platform and processor architecture). Therefore, the multi-architecture registry proxy substitutes source layer 310 of the interpretive runtime or dynamically linked libraries of original container image 302 built for the original processor architecture (e.g., x86 processor architecture) with target layer 324 corresponding to an interpretive runtime of target container image 304 optimized for the different target processor architecture (e.g., s390x processor architecture). Furthermore, source layer 306 of base operating system and source layer 308 of operating system packages are also platform native and are built for the original processor architecture. Thus, the multi-architecture registry proxy substitutes source layer 306 and source layer 308 corresponding to the base operating system and operating system packages of original container image 302 built for the original processor architecture with target layer 320 and target layer 322 corresponding to a base operating system and operating system packages of target container image 304 optimized for that particular target processor architecture.

Figure 4:
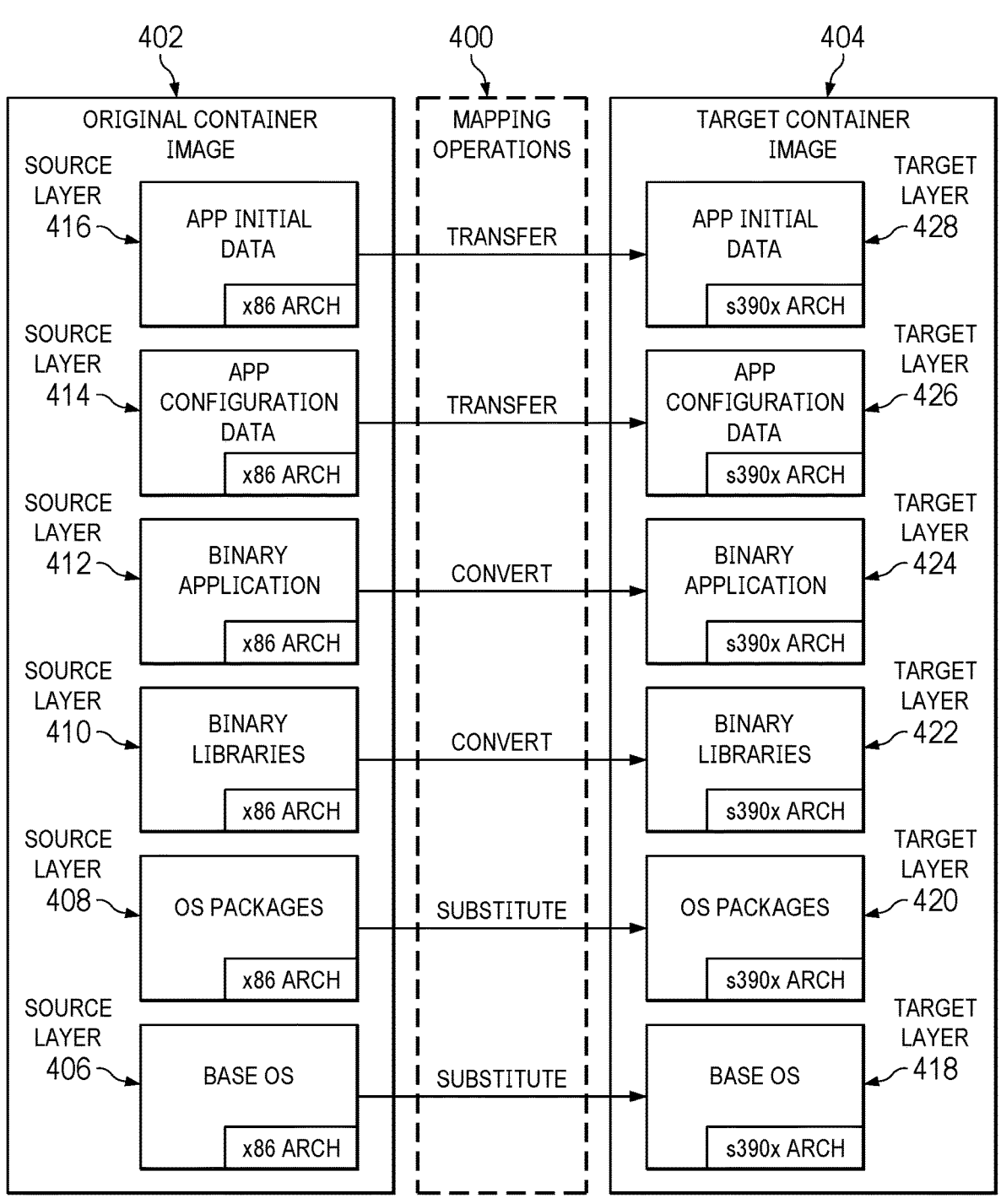
FIG. 4 is a diagram illustrating another example of container layer mapping operations in accordance with an illustrative embodiment.

With reference now to FIG. 4, a diagram illustrating another example of container layer mapping operations is depicted in accordance with an illustrative embodiment. Mapping operations 400 are implemented in a multi-architecture registry proxy, such as, for example, multi-architecture registry proxy 210 in FIG. 2.

In this example, mapping operations 400 involve original container image 402 and target container image 404. Original container image 402 includes source layer 406, source layer 408, source layer 410, source layer 412, source layer 414, and source layer 416. Similarly, target container image 404 includes target layer 418, target layer 420, target layer 422, target layer 424, target layer 426, and target layer 428. It should be noted that target layer 418, target layer 420, target layer 422, target layer 424, target layer 426, and target layer 428 correspond to source layer 406, source layer 408, source layer 410, source layer 412, source layer 414, and source layer 416, respectively. However, it should also be noted that source layer 406, source layer 408, source layer 410, source layer 412, source layer 414, and source layer 416 are each built for a specific processor architecture (e.g., x86 processor architecture) and target layer 418, target layer 420, target layer 422, target layer 424, target layer 426, and target layer 428 are each built and optimized for a different specific processor architecture (e.g., s390x processor architecture).

In this example, the multi-architecture registry proxy transfers source layer 416 of application initial data and source layer 414 of application configuration data as they are to target container image 404 because these layers are platform and processor architecture neutral. Also, because source layer 406 of the base operating system and source layer 408 of operating system packages are platform native and built for the original processor architecture (e.g., x86 processor architecture), the multi-architecture registry proxy substitutes source layer 406 and source layer 408 of original container image 402 with target layer 418 and target layer 420 corresponding to a base operating system and operating system packages of target container image 404 that are optimized for the target processor architecture (e.g., s390x processor architecture).

The multi-architecture registry proxy converts source layer 412 of a binary of the application and its associated source layer 410 of binary libraries, which are compiled from source code, such as, for example, C, C++, or the like, because the compiler complies the binary of the application along with its associated binary libraries or statically linked binary libraries for a specific platform and processor architecture (e.g., x86 processor architecture). The multi-architecture registry proxy performs this conversion by wrapping the original binary with an emulation of the target processor architecture (e.g., s390x processor architecture).

The multi-architecture registry proxy generates the emulation of the target processor architecture utilizing an emulator, such as, for example, emulator 230 in FIG. 2. It should be noted that emulators are available for a plurality of different types of processor architectures. The emulator performs binary translation (e.g., binary recompilation) by translating sequences of instructions from a source instruction set to a target instruction set. Binary translation is performed due to, for example, lack of source code to compile for the target platform, lack of a binary for the target platform, or otherwise difficulty in compiling the source code for the target platform. The multi-architecture registry proxy places converted source layer 412 of the binary of the application with its emulation wrapper and converted source layer 410 of binary libraries with their emulation wrappers in corresponding target layer 424 and target layer 422 of target container image 404 optimized for the target processor architecture (e.g., s390x processor architecture).

The multi-architecture registry proxy can place the binary application and its associated binary libraries, along with their emulation wrappers corresponding to the target processor architecture, in target container image 404 in one of two different ways. The first way is for a simple application, which has an identifiable source code that does not change during the execution. The emulator in the multi-architecture registry proxy processes the binary code of the application ahead of the execution. Effectively, the emulator recompiles the binary code into a new binary with the instructions (i.e., the emulation) for the target processor architecture. The conversion of the binary code in this first approach occurs once during the pull of the container image from the container registry. Once the container image is pulled, repeatable execution of the container on the container runtime of the host computer node does not need to perform the emulation.

The second way is for a complex application, which does not have source code that is easily identifyable without executing the application. In this second approach, the multi-architecture registry proxy transfers the original binary application and its associated binary libraries, along with the emulator that corresponds to the target processor architecture, to the target host computer node. The emulator transferred to the target host computer node emulates the binary code in the target processor architecture for just-in-time execution each time when the execution repeats.

When the source code of the application is available, the multi-arch registry proxy utilizes cross-compilation if available in the source code compiler or emulator to compile the source code into the binary of the target processor architecture. Such recompiled binary and its associated binary libraries replace the original binary and its associated binary libraries in the target container image.

Figure 5:
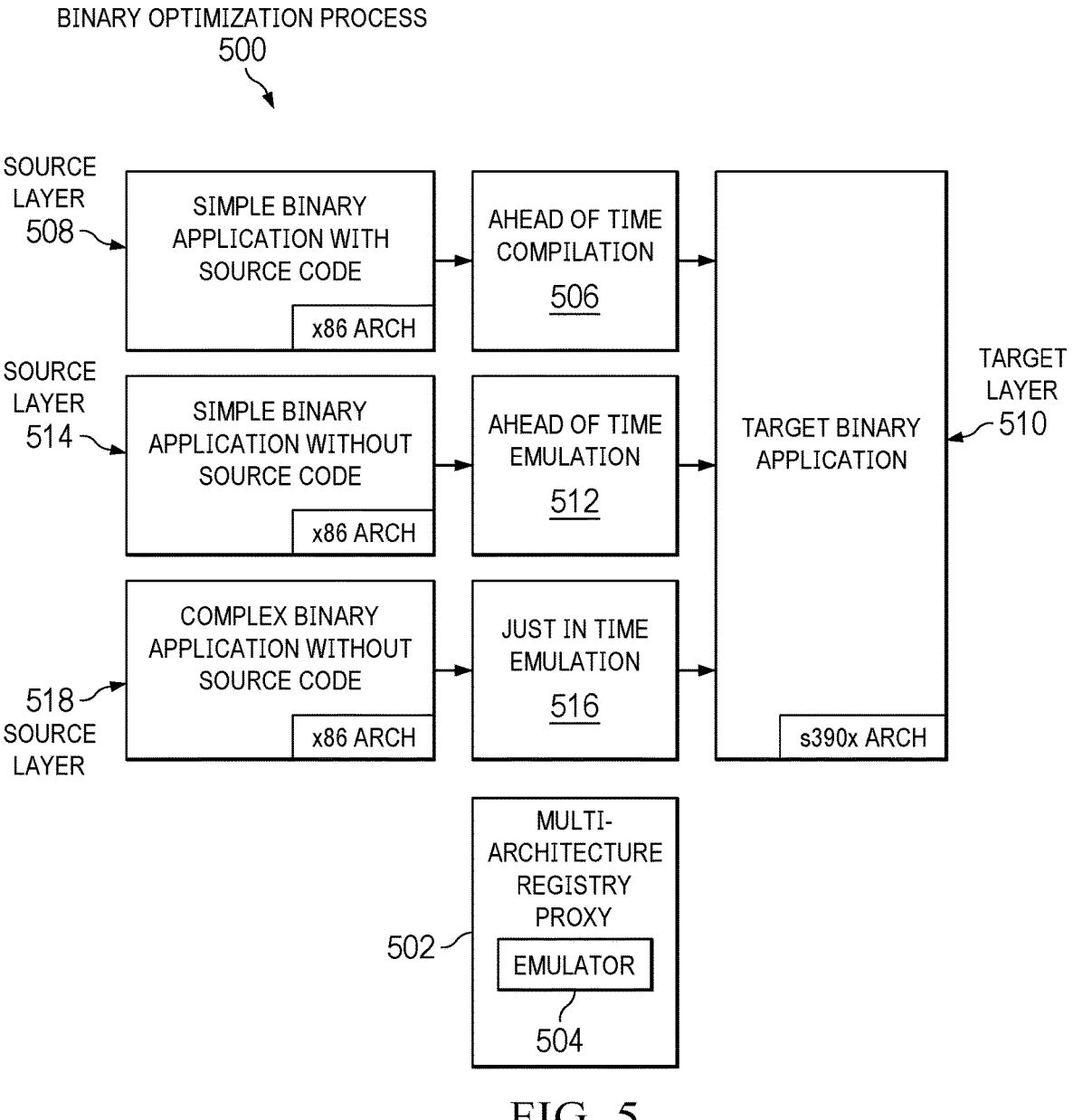
FIG. 5 is a diagram illustrating an example of a binary optimization process in accordance with an illustrative embodiment.

With reference now to FIG. 5, a diagram illustrating an example of a binary optimization process is depicted in accordance with an illustrative embodiment. Binary optimization process 500 is implemented in multi-architecture registry proxy 502, which includes emulator 504, such as, for example, emulator 230 included in multi-architecture registry proxy 210 in FIG. 2.

In this example, at 506, multi-architecture registry proxy 502 utilizes emulator 504 to perform ahead of time compilation of source layer 508 of a simple binary application with source code built for an original processor architecture (e.g., x86 processor architecture) and places recompiled source layer 508, which is now optimized for the target processor architecture (e.g., s390x processor architecture), in target layer 510. Alternatively, at 512, multi-architecture registry proxy 502 utilizes emulator 504 to perform ahead of time emulation of source layer 514 of the simple binary application without source code built for the original processor architecture and places converted source layer 514 with its emulation of the target processor architecture in target layer 510. In an alternative illustrative embodiment, at 516, multi-architecture registry proxy 502 places emulator 504 in target layer 510 to perform just in time emulation of source layer 518 of a complex binary application without source code for just-in-time execution in the target processor architecture.

With reference now to FIG. 6, a diagram illustrating an example of a mapping table is depicted in accordance with an illustrative embodiment. Mapping table 600 is implemented in a mapping database, such as, for example, mapping database 212 in FIG. 2.

In this example, mapping table 600 includes image layer 602, application type 604, processor architecture affinity 606, mapping operation 608, and computational resource ratios 610. Image layer 602 identifies different layers of container images. Application type 604 identifies the type of application associated with a particular image layer. Processor architecture affinity 606 identifies the set of processor architectures that a particular image layer has an affinity for. Mapping operation 608 identifies the type of mapping operation that a multi-architecture registry proxy, such as, for example, multi-architecture registry proxy 210 in FIG. 2, can perform on a particular image layer, such as transfer, substitute, or convert. Computational resource ratios 610 identify the number of computational resources needed by a particular image layer, which was built for a particular processor architecture (e.g., x86 processor architecture), and is being optimized by the multi-architecture registry proxy for a different type of target processor architecture (e.g., s390x). The computational resources include, for example, CPU, RAM, and the like. The computational resource ratios may be, for example, 1:1, 2:1, 3:1, 4:1, 5:1, 6:1, 7:1, 8:1, or the like for the CPU and RAM when going from an original x86 processor architecture to a target s390x processor architecture for a particular image layer. Alternatively, the computational resource ratios may be, for example, 1:2, 1:3, 1:4, 1:5, 1:6, 1:7, 1:8, or the like for different processor architectures.

The requested resources may be given per container. When requested resources are given per container, the multi-architecture registry proxy can apply various techniques. For example, one technique calculates the average container ratio based on individual layers and then uses the average container ratio to calculate needed resources for the target container. Another technique uses the ratio of the most representative layer or an average of two or more such layers, and then uses that ratio to calculate needed resources for the target container. The multi-architecture registry proxy determines representative layers based on application type 604. For example, an image layer with binary application and core functions is representative, while an image layer with application configuration data is not representative.

The multi-architecture registry proxy examines each respective layer of the original container image and performs queries on mapping table 600 to retrieve the layer-to-layer mapping information needed to generate the individual layers of the target container image for the target processor architecture. In addition, the multi-architecture registry proxy can determine the type of a given image layer and the application type using a dictionary of all known container layers and application types. For example, the names of known binaries can be categorized as non-core function applications. Other names can be categorized as, for example, database applications. Yet other names can be categorized as interpretive applications. Moreover, identification data can be categorized as operating systems.

With reference now to FIG. 7, a flowchart illustrating a process for performing container layer translation across different types of processor architectures and computational resource heterogeneity is shown in accordance with an illustrative embodiment. The process shown in FIG. 7 may be implemented in a computer, such as, for example, computer 101 in FIG. 1 or computer 202 in FIG. 2. For example, the process shown in FIG. 7 may be implemented in container layer translation code 200 in FIG. 1.

The process begins when a multi-architecture registry proxy of the computer receives a request to pull an original source container image stored in a container registry from a container runtime of a target host computer node via a network (step 702). The original source container image corresponds to a container, which is associated with an application, that is scheduled to run on the target host computer node.

In response to receiving the request in step 702, the multi-architecture registry proxy determines that the original source container image built for a first type of processor architecture is incompatible with a second type of processor architecture corresponding to the target host computer node (step 704). The first type of processor architecture is different from the second type of processor architecture based on a determined degree of architectural dissimilarity between the first type of processor architecture and the second type of processor architecture.

In response to determining that the original source container image built for the first type of processor architecture is incompatible with the second type of processor architecture corresponding to the target host computer node in step 704, the multi-architecture registry proxy performs dynamic mapping of respective source image layers of the original source container image built for the first type of processor architecture to corresponding target image layers for the second type of processor architecture that is different from the first type of processor architecture (step 706). The dynamically mapping of the respective source image layers of the original source container image built for the first type of processor architecture to the corresponding target image layers of the target container image optimized for the second type of processor architecture includes at least one of: the multi-architecture registry proxy transferring a first set of image layers of the original source container image that contain cross-platform interpretive application data (e.g., application initial data, application configuration data, cross-platform interpretive application, and associated cross-platform interpretive application libraries) to the target container image; the multi-architecture registry proxy substituting a second set of image layers of the original container image that contain cross-platform interpretive runtime data associated with the first type of processor architecture with corresponding image layers that contain interpretive runtime data compatible with the second type of processor architecture; or the multi-architecture registry proxy converting a third set of image layers of the original container image that contain first binary application data (e.g., a binary of the application and a binary of its associated application libraries) to corresponding image layers that contain second binary application data that are compatible with the second type of processor architecture.

The converting of the third set of image layers includes the multi-architecture registry proxy utilizing an emulator to wrap the first binary application data included in particular image layers of the original source container image with an emulation of the second type of processor architecture to form the second binary application data that is compatible with the second type of processor architecture and the multi-architecture registry proxy placing the second binary application data that is compatible with the second type of processor architecture in corresponding layers of the target container image. Alternatively, the converting of the third set of image layers includes the multi-architecture registry proxy placing the emulator along with the first binary application data in the corresponding layers of the target container image for just-in-time emulation and execution in the second type of processor architecture.

In addition, the multi-architecture registry proxy determines computational resource ratios needed to run dynamically mapped image layers of the target container image using the second type of processor architecture based, at least in part, on a technical stack type of the application associated with the respective source image layers of the original container image (step 708). In one illustrative embodiment, the container scheduler queries computational resource ratios from the multi-architecture registry proxy when deploying a container. The container scheduler then utilizes the computational resource ratios queried from the multi-architecture registry proxy to determine a best fit target host computer node based on needed and available computational resources. In an alternative illustrative embodiment, the container scheduler stores the computational resource ratios in a database. In other words, the multi-architecture registry proxy does not store the computational resource ratios. The container scheduler utilizes the database to look up the computational resource ratios when determining which host computer node to schedule the container on. In another alternative illustrative embodiment, the container runtime queries the computational resource ratios from the multi-architecture registry proxy to update available resources on its host computer node after pulling the container image and running an instance of the container.

The multi-architecture registry proxy serves the target container image having the dynamically mapped image layers along with the computational resource ratios to the target host computer node that includes the second type of processor architecture via the network (step 710). Thereafter, the process terminates.

Thus, illustrative embodiments of the present invention provide a computer-implemented method, computer system, and computer program product for performing container layer translation across different types of processor architectures and computational resource heterogeneity. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for container layer translation across different processor architectures, the computer-implemented method comprising:

performing, by a multi-architecture registry proxy, dynamic mapping of respective source image layers of an original source container image built for a first type of processor architecture to corresponding target image layers for a second type of processor architecture that is different from the first type of processor architecture;

determining, by the multi-architecture registry proxy, computational resource ratios needed to run dynamically mapped image layers of a target container image using the second type of processor architecture based, at least in part, on a technical stack type of an application associated with the respective source image layers of the original source container image; and serving, by the multi-architecture registry proxy, the target container image having the dynamically mapped image layers along with the computational resource ratios to a target host computer node that includes the second type of processor architecture via a network.

2. The computer-implemented method of claim 1, wherein the dynamic mapping of the respective source image layers of the original source container image built for the first type of processor architecture to the corresponding target image layers of the target container image optimized for the second type of processor architecture is performed in response to:

receiving, by the multi-architecture registry proxy, a request to pull the original source container image stored in a container registry from a container runtime of the target host computer node via the network, the original source container image corresponds to a container scheduled to run on the target host computer node; and determining, by the multi-architecture registry proxy, that the original source container image built for the first type of processor architecture is incompatible with the second type of processor architecture corresponding to the target host computer node, the first type of processor architecture is different from the second type of processor architecture based on a determined degree of architectural dissimilarity between the first type of processor architecture and the second type of processor architecture.

3. The computer-implemented method of claim 1, wherein the dynamic mapping of the respective source image layers of the original source container image built for the first type of processor architecture to the corresponding target image layers of the target container image built for the second type of processor architecture includes:

transferring, by the multi-architecture registry proxy, a first set of image layers of the original source container image that contain cross-platform interpretive application data to the target container image, the cross-platform interpretive application data include at least one of application initial data, application configuration data, or application libraries.

4. The computer-implemented method of claim 1, wherein the dynamic mapping of the respective source image layers of the original source container image built for the first type of processor architecture to the corresponding target image layers of the target container image built for the second type of processor architecture includes:

substituting, by the multi-architecture registry proxy, a second set of image layers of the original source container image that contain cross-platform interpretive runtime data associated with the first type of processor architecture with corresponding image layers that contain interpretive runtime data compatible with the second type of processor architecture.

5. The computer-implemented method of claim 1, wherein the dynamic mapping of the respective source image layers of the original source container image built for the first type of processor architecture to the corresponding target image layers of the target container image built for the second type of processor architecture includes:

converting, by the multi-architecture registry proxy, a third set of image layers of the original source container image that contain first binary application data to corresponding image layers that contain second binary application data that are compatible with the second type of processor architecture.

6. The computer-implemented method of claim 5, wherein the converting of the third set of image layers of the original source container image that contain first binary application data to the corresponding image layers that contain second binary application data that are compatible with the second type of processor architecture includes:

wrapping, by the multi-architecture registry proxy utilizing an emulator, the first binary application data included in particular image layers of the original source container image with an emulation of the second type of processor architecture to form the second binary application data that is compatible with the second type of processor architecture; and placing, by the multi-architecture registry, the second binary application data that is compatible with the second type of processor architecture in corresponding layers of the target container image.

7. The computer-implemented method of claim 5, wherein the converting of the third set of image layers of the original source container image that contain first binary application data to the corresponding image layers that contain second binary application data that are compatible with the second type of processor architecture includes:

placing, by the multi-architecture registry proxy, an emulator along with the first binary application data in corresponding layers of the target container image for just-in-time emulation and execution in the second type of processor architecture.

8. The computer-implemented method of claim 1, wherein the determining of the computational resource ratios needed to run the dynamically mapped image layers of the target container image using the second type of processor architecture includes a container scheduler querying the computational resource ratios from the multi-architecture registry proxy when deploying a container, the container scheduler utilizes the computational resource ratios queried from the multi-architecture registry proxy to determine that the target host computer node is a best fit for the container based on needed and available computational resources.

9. The computer-implemented method of claim 1, wherein the determining of the computational resource ratios needed to run the dynamically mapped image layers of the target container image using the second type of processor architecture includes a container scheduler storing the computational resource ratios to determine which host computer node to schedule a container on.

10. The computer-implemented method of claim 1, wherein the determining of the computational resource ratios needed to run the dynamically mapped image layers of the target container image using the second type of processor architecture includes a container runtime of the target host computer node querying the computational resource ratios from the multi-architecture registry proxy to update available resources on the target host computer node after pulling the original source container image and running an instance of a container.

11. A computer system for performing container layer translation across different types of processor architectures, the computer system comprising:

a communication fabric;

a storage device connected to the communication fabric, wherein the storage device stores program instructions; and a processor connected to the communication fabric, wherein the processor executes the program instructions to:

perform dynamic mapping of respective source image layers of an original source container image built for a first type of processor architecture to corresponding target image layers for a second type of processor architecture that is different from the first type of processor architecture;

determine computational resource ratios needed to run dynamically mapped image layers of a target container image using the second type of processor architecture based, at least in part, on a technical stack type of an application associated with the respective source image layers of the original source container image; and serve the target container image having the dynamically mapped image layers along with the computational resource ratios to a target host computer node that includes the second type of processor architecture via a network.

12. The computer system of claim 11, wherein the processor further executes the program instructions to:

receive a request to pull the original source container image stored in a container registry from a container runtime of the target host computer node via the network, the original source container image corresponds to a container scheduled to run on the target host computer node; and determine that the original source container image built for the first type of processor architecture is incompatible with the second type of processor architecture corresponding to the target host computer node, the first type of processor architecture is different from the second type of processor architecture based on a determined degree of architectural dissimilarity between the first type of processor architecture and the second type of processor architecture.

13. The computer system of claim 11, wherein the dynamic mapping of the respective source image layers of the original source container image built for the first type of processor architecture to the corresponding target image layers of the target container image built for the second type of processor architecture includes:

transferring a first set of image layers of the original source container image that contain cross-platform interpretive application data to the target container image, the cross-platform interpretive application data include at least one of application initial data, application configuration data, or application libraries.

14. The computer system of claim 11, wherein the dynamic mapping of the respective source image layers of the original source container image built for the first type of processor architecture to the corresponding target image layers of the target container image built for the second type of processor architecture includes:

substituting a second set of image layers of the original source container image that contain cross-platform interpretive runtime data associated with the first type of processor architecture with corresponding image layers that contain interpretive runtime data compatible with the second type of processor architecture.

15. The computer system of claim 11, wherein the dynamic mapping of the respective source image layers of the original source container image built for the first type of processor architecture to the corresponding target image layers of the target container image built for the second type of processor architecture includes:

converting a third set of image layers of the original source container image that contain first binary application data to corresponding image layers that contain second binary application data that are compatible with the second type of processor architecture.

16. A computer program product for performing container layer translation across different types of processor architectures, the computer program product comprising a computer-readable storage medium having program instructions embodied therewith, the program instructions executable by a computer to cause the computer to perform a method of:

performing, by a multi-architecture registry proxy of the computer, dynamic mapping of respective source image layers of an original source container image built for a first type of processor architecture to corresponding target image layers for a second type of processor architecture that is different from the first type of processor architecture;

determining, by the multi-architecture registry proxy, computational resource ratios needed to run dynamically mapped image layers of a target container image using the second type of processor architecture based, at least in part, on a technical stack type of an application associated with the respective source image layers of the original source container image; and serving, by the multi-architecture registry proxy, the target container image having the dynamically mapped image layers along with the computational resource ratios to a target host computer node that includes the second type of processor architecture via a network.

17. The computer program product of claim 16, wherein the dynamic mapping of the respective source image layers of the original source container image built for the first type of processor architecture to the corresponding target image layers of the target container image optimized for the second type of processor architecture is performed in response to:

receiving, by the multi-architecture registry proxy, a request to pull the original source container image stored in a container registry from a container runtime of the target host computer node via the network, the original source container image corresponds to a container scheduled to run on the target host computer node; and determining, by the multi-architecture registry proxy, that the original source container image built for the first type of processor architecture is incompatible with the second type of processor architecture corresponding to the target host computer node, the first type of processor architecture is different from the second type of processor architecture based on a determined degree of architectural dissimilarity between the first type of processor architecture and the second type of processor architecture.

18. The computer program product of claim 16, wherein the dynamic mapping of the respective source image layers of the original source container image built for the first type of processor architecture to the corresponding target image layers of the target container image built for the second type of processor architecture includes:

transferring, by the multi-architecture registry proxy, a first set of image layers of the original source container image that contain cross-platform interpretive application data to the target container image, the cross-platform interpretive application data include at least one of application initial data, application configuration data, or application libraries.

19. The computer program product of claim 16, wherein the dynamic mapping of the respective source image layers of the original source container image built for the first type of processor architecture to the corresponding target image layers of the target container image built for the second type of processor architecture includes:

substituting, by the multi-architecture registry proxy, a second set of image layers of the original source container image that contain cross-platform interpretive runtime data associated with the first type of processor architecture with corresponding image layers that contain interpretive runtime data compatible with the second type of processor architecture.

20. The computer program product of claim 16, wherein the dynamic mapping of the respective source image layers of the original source container image built for the first type of processor architecture to the corresponding target image layers of the target container image built for the second type of processor architecture includes:

converting, by the multi-architecture registry proxy, a third set of image layers of the original source container image that contain first binary application data to corresponding image layers that contain second binary application data that are compatible with the second type of processor architecture.

* * * * *